Figure 1:
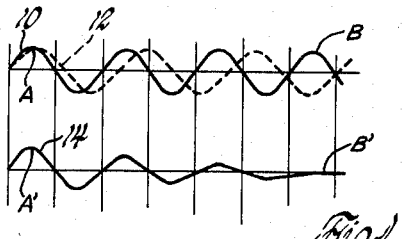

March 22, 1966     A. HARDY     3,241,392
GEARING

Filed Sept. 21, 1961     2 Sheets-Sheet 1

INVENTOR.
Alexander Hardy
BY
Hugh S. Fisher
ATTORNEY

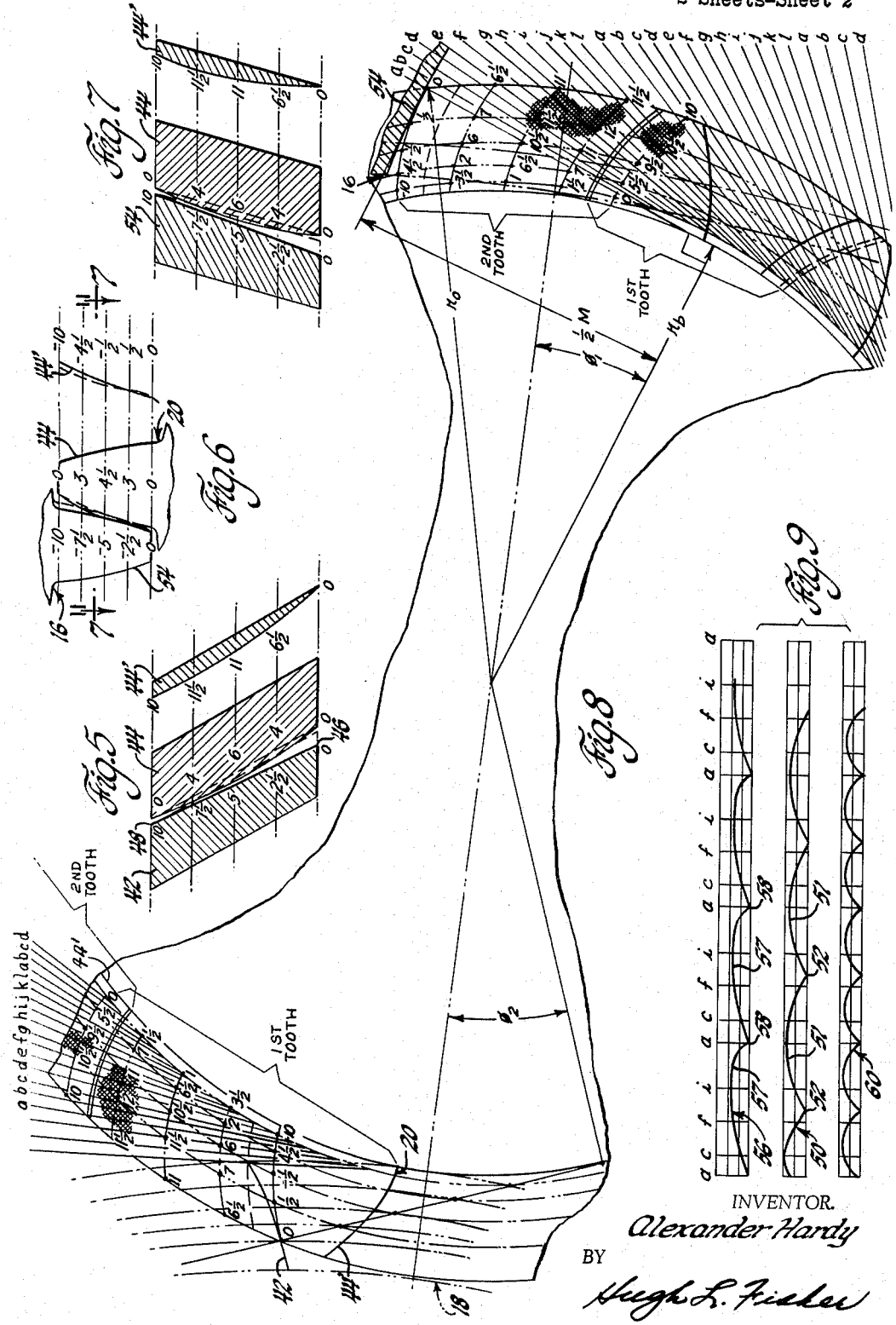

United States Patent Office 3,241,392
Patented Mar. 22, 1966

3,241,392
GEARING
Alexander Hardy, Detroit, Mich., assignor to General Motors Corporation, Detroit, Mich., a corporation of Delaware
Filed Sept. 21, 1961, Ser. No. 139,647
10 Claims. (Cl. 74—462)

This invention concerns a method of controlling gear noise and also relates to gearing systems particularly concerned with the control of gear noise.

Constant efforts are being made to reduce gear noise, particularly in vehicle transmissions where any pronounced gear noise can become very objectionable, particularly in a relatively quietly operating passenger vehicle. In general, gear noise is produced by acoustic impulses generated along the line of action between two mating gear teeth. These acoustic impulses may have their greatest amplitude at the time that the teeth enter or leave mesh or at any other point between these entering and leaving points. The point of greatest magnitude, of course, is influenced by the quality of the gear teeth, i.e., how closely the teeth have conformed to permissive manufacturing tolerances. Theoretically, smooth tooth action should occur with gearing having no lead or involute errors, perfect spacing, precise squareness and concentricity, and ideal supports. But, the production and installation of such perfect gears imposes a substantial burden on conventional gear manufacturing processes and is reflected in increased costs. Even with a theoretically perfect gear, varying tangential loads, which are inherent if the applied torque varies, produce changes in tooth deflection. Also, at certain times there normally are a different number of teeth assuming the load. The variation in the deflection of the teeth then in itself can be a source of noise, and this, even a perfect gear set cannot overcome.

With the foregoing in mind, the invention contemplates a new and different mode of controlling gear noise, a method in which gearing produced acoustic impulses are phase related to achieve relatively noise-free operation. The invention further contemplates a gearing system in which the formation of the gear teeth produces acoustic impulses having a sound attenuating phase relationship. A related objective is to provide a gearing system in which the arrangement of the gears also produces acoustic impulses having this sound attenuating phase relationship.

Another aim of the invention is to phase relate acoustic impulses from a gearing system by both forming and arranging gears according to a predetermined scheme so as to enable gear noise to be accurately controlled.

A still more specific aim of the invention is to form gear teeth so that the phase of the acoustic impulses generated by one set of contacting teeth is different from the phase of the acoustic impulse generated by another set of contacting teeth, and thereby cause the two disturbances to neutralize each other. Also, by the invention, predetermined gear spacing promotes the differential phase relation for quiet gear performance.

Figure 2:
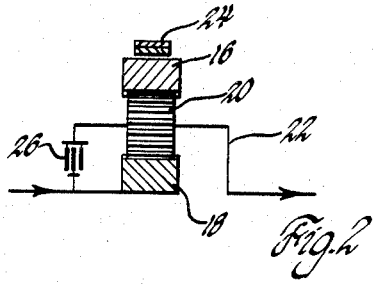
Figure 2A:
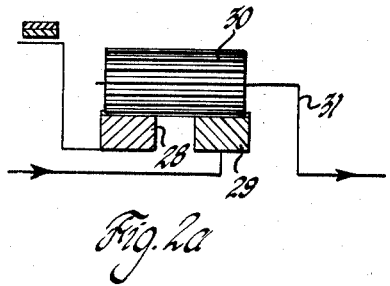
Figure 2B:
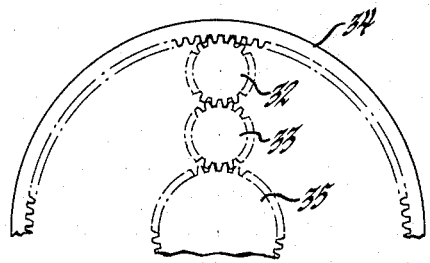
Figure 2C:
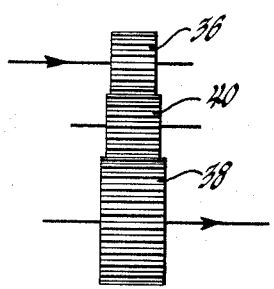
Figure 3:
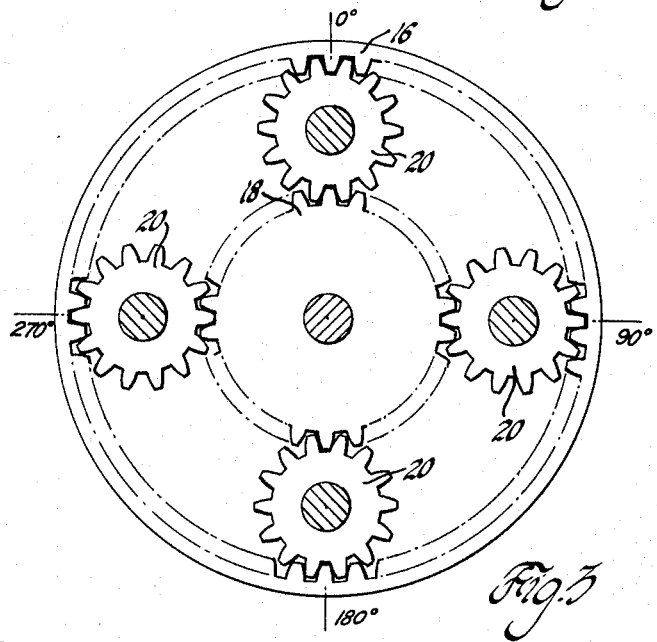
Figure 4:
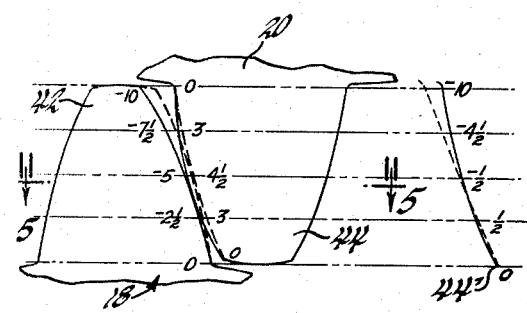

The foregoing and other objects and advantages of the invention will be apparent from the following description and from the accompanying drawings in which:

FIGURE 1 is a graph showing sound waves;
FIGURE 2 is a schematic view of a simple planetary gear set employed to illustrate the invention;
FIGURES 2a, 2b, and 2c are modifications of the FIGURE 2 gear set;
FIGURE 3 is a front elevational view of the FIGURE 2 gear set;
FIGURE 4 is an enlarged fragmentary sectional view portraying engaging sun and pinion gear teeth of a character utilized by the FIGURE 2 gear set;
FIGURE 5 is a sectional view of the FIGURE 4 teeth taken along line 5—5 of FIGURE 4;
FIGURE 6 is an enlarged fragmentary sectional view portraying engaging ring and pinion gear teeth of the type employed in the FIGURE 2 gear set;
FIGURE 7 is a sectional view of the teeth shown in FIGURE 6 taken along line 7—7 of FIGURE 6;
FIGURE 8 is an enlarged view of the FIGURE 3 illustration affording a graphical representation and analysis of the relationship between the mating teeth in the FIGURE 2 gear set; and
FIGURE 9 is a graph of information derived from the FIGURE 8 analysis to correlate the acoustic impulses produced by the FIGURE 2 gear set.

To understand the general nature of noise and the theory, which will subsequently be related to gearing, reference is first made to two curves, 10 and 12, portrayed in the upper part of FIGURE 1. Each of the curves 10 and 12 represent a sound wave of the same amplitude but of a different frequency. The lower curve, denoted generally by the numeral 14, is a summation of the two curves 10 and 12 or the result of two sounds producing the individual curves 10 and 12 occurring together. As can be observed from FIGURE 1, at a point A, where the curves 10 and 12 are in phase, the sound effects are additive and produce at a point A' on the curve 14 a loud sound. At a point B the two curves 10 and 12 are 180 degrees out of phase so that at a point B' on the curve 14 there is no sound since the two sounds neutralize and therefore cancel each other. In effect, by inversely relating the phases of two sounds, they can both be eliminated. This principle, as applied to gearing, will hereinafter be referred to as "counterphasing."

Before undertaking an explanation of "counterphasing," it should be appreciated that generally gearing presents more than one source of noise. Exemplary is the four pinion planetary gear set illustrated in FIGURES 2 and 3. As shown in FIGURE 2, the planetary gear set includes both a ring gear 16 and a sun gear 18, each of which meshes with four planet pinions 20. The planet pinions 20 are journaled on a planet carrier 22 and so arranged as to be equally spaced with respect to each other for reasons to be explained. As is well understood, with the ring gear 16 held stationary, as by a brake 24, and with drive being supplied to the sun gear 18, the planet carrier 22 will be driven at a reduced speed relative to the sun gear 18; this speed being determined by the ratio of the gear set. Also, the gear set can provide a direct drive merely by joining two elements of the gear set together, such as the planet carrier 22 and the sun gear 18 by a clutch 26.

Considering now the gear set from a noise standpoint, it will be noted from an inspection of FIGURE 3 that each planet pinion 20 is in engagement with two gears, namely the ring and sun gears 16 and 18, so that four sets of acoustic impulses are developed from the eight sources, all of the same frequency.

Since, in the past, gear perfection has been constantly sought in an effort to achieve smooth tooth action and quiet operation, these acoustic impulses of the same frequency will also closely coincide in phase. The two sets of acoustic impulses from the pinions 20 produce vibrations that are transferred through the journal supports for the pinions 20 to the carrier 22 and then through the shafting. Also, both the ring gear 16 and the sun gear 18 transfer vibrations to their respective shafting. Of course, the noise tends to be magnified and side effects are produced, e.g., wear. It can therefore be appreciated from the foregoing that considerable noise will be generated. Even if very smooth tooth action occurs, variations in loading will induce in-phase acoustic impulses and accordingly the objectionable noise.

This problem is not limited to the simple planetary gear set shown by FIGURE 2 but occurs with any gearing arrangement in which there are at least two sets of engaging teeth. For example, the planetary gear set in FIGURE 2a has both a reaction sun gear 28 and an input sun gear 29 meshing with an elongated pinion 30 journaled on an output planet carrier 31. The engagements between the two sun gears 28 and 29 with the elongated pinion 30 both are sources of the objectionable noise discussed relative to the FIGURE 2 gearing. A variation of the FIGURE 2a gear set would replace the two sun gears 28 and 29 with two ring gears..

In FIGURE 2b, double pinions 32 and 33 engage, respectively, a ring gear 34 and a sun gear 35. As a result, each pinion presents two sources of disturbances.

A still different gearing arrangement is illustrated in FIGURE 2c. In this arrangement, an input gear 36 and an output gear 38 both engage an idler gear 40 to provide a somewhat conventional countershaft type reverse. As with the FIGURES 2 and 2a arrangements, acoustic impulses are generated by the engagement of the idler gear 40 both with the input and output gears 36 and 38. These acoustic impulses will complement each other and again will produce the objectionable noise. Even countershaft gearing where the countershaft gears transfer drive between input and output gears presents two sources of vibrations.

The examples mentioned are not intended to include all arrangements that would involve the problem. There are others as those versed in the art will be aware.

Complete or effective "counterphasing" requires that both gear spacing and gear tooth forms together produce acoustic impulses of the proper phase relationship if the gear noise is to be diminished. This, of course, can not be done satisfactorily by trial and error but only by a careful analysis of the gearing to be "counterphased." Consequently, conventional gearing must be altered in order to reproduce the desired mode of acoustic impulses.

To accomplish "counterphasing," it is first necessary to determine the type of gearing to be utilized. For purposes of explanation, the planetary gear set illustrated in FIGURES 2 and 3 will be employed. Next, it becomes necessary to determine the gear ratio so that the number and size of the pinions 20 can be established. It will therefore be further assumed that the ring gear 16 has 58 teeth; that the sun gear 18, 30 teeth; and that the planet pinions 20 each have 14 teeth. These tooth numbers produce a 2.93 ratio; i.e., with the ring gear 16 held by the brake 24, the output carrier 22 will revolve once while the input sun gear 18 rotates 2.93 revolutions.

The next step is to determine the outside radius ($r_o$) of the planet pinions 20. The need for this determination becomes apparent from an inspection of FIGURE 8, for as seen, if the outer radius of the planet pinion 20 is, for example, increased, the relationship between the impulses created by the engagement of the pinion 20 and the ring gear 16 and the impulses produced by the engagement of the pinion 20 and the sun gear 18 will be changed, keeping in mind that the displayed positions of the ring and sun gears 16 and 18 are maintained.

The outer radius of the planet pinions 20 can be ascertained by the following procedure, which involves triangulation as can be observed from FIGURE 8.

First, a value X, which is equivalent to a certain number of circular pitches, as will become evident, can be determined, by the equation:

$$X = \left(\frac{N}{2}+1\right) - \frac{N}{360°}(180° - \phi_1 - \phi_2)$$

If there were an odd number of teeth on the pinions, the formula would be:

$$X = \left(\frac{N}{2}+1\frac{1}{2}\right) - \frac{N}{360°}(180° - \phi_1 - \phi_2)$$

Upon determining X, its value is substituted in the equation:

$$M = r_b\left(\frac{\pi X}{N} + \frac{t_c}{2r_c} + \text{inv. } \phi_c\right)$$

Knowing two sides of the triangle, the outer radius of the pinion is determined from the equation:

$$r_o = [(\tfrac{1}{2}M)^2 + r_b^2]^{\frac{1}{2}}$$

In these equations, $r_b$ = the radius of the base circle of the pinion.
$N$ = the number of teeth on the pinion 20.
$t_c$ = the thickness of the pinion tooth at any radius $r_c$.
$\phi_c$ = the operating pressure angle at $r_c$.
$\phi_1$ = the operating pressure angle between the pinion 20 and the ring gear 16.
$\phi_2$ = the operating pressure angle between the pinion 20 and the sun gear 18.

With the ratio of the gearing and the outside radius of the pinions 20 established, the required changing of the gear teeth from the conventional for "counterphasing" purposes can be commenced. Considering first the teeth on the sun gear 18 and the pinions 20, reference is made to FIGURE 4 where the profiles of both the sun gear teeth and pinion teeth, denoted respectively by the numerals 42 and 44, are shown. The sun gear teeth 42 have been altered relative to a true involute shape shown by the broken line. The relief is started at the zero point, which is the point where the tooth enters mesh and continues to the outside end of the tooth at the indicated intervals. The relief is 0, .00025, .0005, .00075, and .0010 of an inch. For simplicity, these amounts will hereinafter be referred to as units. Hence, the teeth 42 are relieved 2½, 5, 7½, and 10 units. The teeth 44 on the planet pinions 20 have been crowned from the zero point or point where tooth enters mesh, 3, 4½, 3, and 0 units, the true involute again being shown by the broken line.

By summing these changes and transferring them to the pinion tooth 44', the deviations from a true profile become −10, −4½, −½, ½, and 0. The reason for this will become clear when the FIGURE 8 analysis is described.

In FIGURE 5, the alteration of the leads of the two teeth 42 and 44 is shown. The broken lines indicate the true lead along the engaging surfaces of the teeth 42 and 44. The teeth 42 on the sun gear 18 have been given a positive lead so as to give a light entering at point 46 and a heavy leaving at the point 48. The units of relief for providing this are indicated. The teeth 44 on the pinions 20 have had the lead altered to give a crown effect and the units are also shown. These variations, as in FIGURE 4, when summed and transferred to the pinion tooth 44' result in the illustrated contour. The total units of deviation of the tooth 44' starting at zero point are successively 6½, 11, 11½, and 10 units.

The information derived from FIGURES 4 and 5 is now used in the graphical analysis of FIGURE 8. The letered lines a, b, c, d, e, etc. on the left side of FIGURE 8 denote the scanning position of the line of action between the pinions 20 and the sun gear 18. Two of the pinion teeth 44' are shown and are identified as first and second teeth to show the overlap of consecutively engaging teeth. The infromation from FIGURE 5 is plotted along the top of the tooth 44′, whereas the information from FIGURE 4 is marked along the profile side of the tooth 44′. At certain points along the face of the tooth 44′, the units that the tooth 44′ deviates at these points from a true contour are indicated. For example, upon plotting the proper values along the ½ unit line, the points will become 7 (6½+½), 11½ (11+½), 12 (11½+½), and 10½ (10+½) units. By applying this same procedure to −½, −4½ and −10 unit lines, the denoted unit values are obtained. From this information, it can be ascertained by inspection that the high point on the tooth 44′, which will be the point producing the acoustic impulse, will occur in the depicted shaded area.

While the information from FIGURE 8, a curve 50 on the FIGURE 9 graph can be developed by selecting the high point along each line of action and plotting the value on the corresponding line of the graph abscissa. For instance, starting with the line of action (a), the high point on the first tooth occurs at approximately 11½ units and along the line of action (c), the high point occurs at 12 units.

Commencing along the line of action (g), the highest area is now on the second tooth and accordingly the second tooth takes over, the high point being approximately 10 units. The second tooth produces the same curve as the first tooth, as does each successive tooth. Consequently, the curve 50 has cresas at 51 and troughs at 52.

The preceding procedure is again followed in analyzing the relationship between the ring gear teeth designated by the numeral 54, and the pinion teeth 44. The ring gear teeth 54 have been relieved the indicated units from the true contour shown by the broken line, whereas the pinion teeth 44 have been altered so as to have a crown of the same magnitude but on the opposite side from that shown in FIGURE 4. The resultant tooth 44′, which is again a summation of the units that the teeth 54 and 44 deviate from a true contour, differs commencing at 0, ½, −½, −4½, and −10 units from a conventional tooth having the broken line shape.

The lead of the teeth 54 on the ring gear 16 is negative since the sun gear teeth 42 have been given a positive lead. Therefore, the teeth 54 are relieved from the broken line the number of units specified in FIGURE 7. The lead of the pinion teeth 44 is changed so as to produce a convex contour. The composite pinion tooth 44′ has the illustrated lead, which, starting at zero, deviates successively 6½, 11, 11½, and 10 units from a normal unaltered lead.

Applying this information to the FIGURE 8 graph in the same previously discussed manner, the occurrence of the high area can be accurately determined. In this instance, the high area occurs along the shaded portion of the pinion tooth 44′. A plot of this information on the FIGURE 9 graph will produce a curve 56. As can be seen, the crests 57 and the troughs 58 of the curve 56 do not coincide with the crests 51 and the troughs 52 on the curve 50 but in fact are spaced intermediate each other. Of course, this was predetermined for the discussed example; however, if the curves 50 and 56 were not as depicted, it will be appreciated that the position of the high areas can be maneuvered by changing leads and involutes until the proper curves are obtained.

By having the crests 57 of the curve 56 coincident with the troughs 52 of the curve 50, "counterphasing" will have been achieved. For the high areas will generate acoustic impulses that have the desired inverse phase relationship or that are 180° out of phase. The resultant vibration transferred to the carrier 22 will produce a curve 60 and will have a substantially reduced noise level.

With the proper "counterphasing" of the pinions 20, the pinions 20 will be subjected simultaneously to accelerating and decelerating forces. For example, if the pinions 20 are being accelerated by the engagement with the ring gear 16, the sun gear 18 should cause the pinions 20 at the same time to be decelerated if the appropriate lead and involute modifications have been made. These forces therefore, in effect, cancel each other and will in turn cause the transmission of torque from the pinions 20 to the carrier 22 through the journal connections to be smooth. This technique is very effective in attenuating gear noise. Otherwise, if the forces, e.g., both produced acceleration, the resultant pinion speed-up would produce a "jerk," which would be transferred to the pinion journal connections and produce the undesired noise.

To complete the counterphasing of the gear set, the pinions 20 must be properly positioned on the carrier 22. With a space index of 88 (the sum of the teeth on the ring and sun gears 16 and 18), there are 88 equally spaced locations for pinions 20. If four pinions 20 are needed to carry the loads and they are equally spaced, the pitch points on the sun gear 18 will be 7½ teeth apart. Assuming that the upper and lower pinions 20 have the positions viewed in FIGURE 3, the left and right pinions 20 will have positions that are ½ tooth different. In other words, if the sun gear 18 has a whole tooth centrally located on the vertical center line or at 0°; at 90°, a full tooth opening will occur; at 180°, a whole tooth; and at 270°, another tooth opening. By positioning the pinions 20 in this way, the sun gear 18 will be counterphased since the acoustic impulses at 0° and at 180° will be 180° out of phase with the acoustic impulses at 90° and 270°. Hence, the vibrations transferred to the sun gear shafting are substantially reduced, the resultant curve being similar to the FIGURE 9 curve 60.

When the pinions 20 have been "counterphased" relative to the sun gear 18, they will, in this embodiment, automatically be "counterphased" with respect to the ring gear 16. The reason for this is that the pinions 20 located at 90° and 270°, must be turned ½ of a circular pitch or ½ tooth further than the pinions 20 at 0° or 180° in order to be installed. Consequently the pinions 20 at 90° and at 270° engage the ring gear 16 differently than the pinions 0° and 270° and in the same way relative to the sun gear 16 become "counterphased."

Regardless of the number of pinions to be used, in general, the object is to produce a number of equally spaced pulses within a circular pitch. This will reduce the gear noise from spacing. For example, if three pinions were to be employed they could be positioned so that two of the pinions would have engagements that were respectively ⅓ and ⅔ of a circular pitch different from the other pinion.

As can be appreciated, by carefully predetermined the acoustic impulses of the gear set in the foregoing way and causing them to be properly phase related, the dimensionally perfect gear can now be made quiet.

The invention is to be limited only by the following claims:

1. A method of controlling the noise produced by a gearing system having two gears meshing each with a common gear, the method comprising forming the gearing teeth so that the meshing engagements between one gear and the common gear and between the other gear and the common gear occur at different times to thereby cause the common gear to have a accelerating force applied thereto by the meshing engagement with one gear and a decelerating force applied thereto by the meshing engagement with the other gear, the forces being of such a direction and magnitude as to substantially cancel each other and thereby attenuate the gear noise from the system.

2. In combination, a gear train having a series of mating gears with at least two sets of contacting teeth each generating acoustic impulses of the same frequency, the mating gears having acoustic impulse producing areas arranged at certain locations on the teeth thereof so that the meshing engagements between one set of contacting teeth and between the other set of contacting teeth occur at different times to thereby cause the acoustic impulses produced by the one set of contacting teeth to be substantially inversely phase related to the acoustic impulses produced by the other set of contacting teeth and so spaced relative to each other as to also produce substantially inversely phased acoustic impulses thereby causing the noise from the gear train to be reduced.

3. In combination, a gear train having a pair of gears each meshing with a common gear, the gears of the train having the teeth shaped that the meshing engagements between one gear and the common gear and between the other gear and the common gear occur at different times to thereby cause the common gear to have an accelerating force applied thereto by the meshing engagement with one gear and a decelerating force applied thereto by the meshing engagement with the other gear, the forces being of such a direction and magnitude as to substantially cancel each other and thereby attenuate the gear noise from the train.

4. In combination, a planetary gear set having a pair of gears and a carrier having planet pinions revolvably supported thereon, means conditioning the gear set for operation in a certain drive ratio, the gears and the pinions having acoustic impulse producing areas on the respective teeth thereof at predetermined locations so that the meshing engagements between one gear and the pinions and between another gear and the pinions occur at different times to thereby cause the pinions to generate two trains of acoustic impulses of a substantially inverse noise attenuating phase relationship thereby reducing the gear noise from the two trains of impulses, the pinions being positioned on the carrier so that two of the pinions engage one of the gears and produce substantially inversely phase related noise attenuating acoustic impulses and also that two of the pinions engage another of the gears and produce substantially inversely phased related noise attenuating acoustic impulses.

5. In combination, a planetary gear set including gear elements and a planet carrier element having plural sets of planet pinions revolvably arranged thereon so as to engage the gear elements, means conditioning the gear set for transferring drive from one of the elements to another of the elements, the planet pinions and the gear elements having the teeth thereon so shaped that the meshing engagements between one gear element and the planet pinions and between another gear element and the planet pinions occur at different times to thereby cause each pinion to have an accelerating force applied thereto by the engagement with one gear element and a decelerating force applied thereto by the engagement with another of the gear elements, the forces being of opposing magnitudes so as to substantially cancel each other and thereby attenuate the gear noise from the gear set, the planet pinions being spaced on the carrier so that the phase of the acoustic impulses produced by the engagement of one set of pinions with on gear element is substantially inverse to the phase of the acoustic impulses produced by the engagement of the other set of pinions with the one gear element and so that the phase of the acoustic impulses produced by the engagement of the one set of pinions with the other gear element are also substantially inverse to the phase of the acoustic impulses produced by the engagement of the other set of pinions with the other gear element thereby further reducing the gear noise from the gear set.

6. In combination, a planetary gear set including ring and sun gears, a planet carrier having plural sets of planet pinions revolvably arranged thereon so that each engage both the ring and sun gears, means driving one of the gears at a certain speed, and means holding the other of the gears so that the planet carrier is driven at a speed different from the speed of the one gear and so that the acoustic impulses generated by the engagement of each gear with the pinions are of substantially the same frequency, the gears and the pinions having the teeth thereon provided with acoustic impulse producing areas at predetermined locations so that the meshing engagements between the sun gear and the pinions and between the ring gear and the pinions occur at different times to thereby cause the acoustic impulses generated by the engagement of the pinions with the sun gear to have a substantially inverse noise attenuating phase relationship to the acoustic impulses generated by the engagement of the pinions with the ring gear so as to reduce the noise from the gear set, the pinions being so spaced on the carrier that the acoustic impulses produced by the engagement of one set of pinions with the sun gear have a sound attenuating inverse phase relationship to the acoustic impulses produced by the engagement of another set of pinions with the sun gear and so that the acoustic impulses produced by the engagement of the one set of pinions with the ring gear also have a sound attenuating inverse phase relationship to the acoustic impulses produced by the engagement of the another set of pinions with the ring gear.

7. A method of controlling the noise produced by a plural gear system comprising arranging the gears each on at least three different supports so as to have two sets of contacting teeth, establishing the location along the line of action between one set of contacting teeth where contact will produce acoustic impulses of a certain phase, forming corresponding acoustic impulses producing areas on the teeth of one of the gears providing the one set of contacting teeth, establishing the location along the line of action between the other set of contacting teeth where contact will produce acoustic impulses of a different and of a noise attenuating phase relative to the certain phase of the acoustic impulses produced by the one set of contacting teeth, and forming corresponding acoustic impulse producing areas on the teeth of one of the gears providing the other set of contacting teeth.

8. A method of controlling the noise produced by a plural gear system comprising arranging the gears each on at least three different supports so as to have two sets of contacting teeth, altering the lead of the teeth on one of the gears so as to form at certain locations thereon acoustic impulse producing areas that will cause acoustic impulses of a certain phase to be developed by one set of contacting teeth, and altering the lead of the teeth on another of the gears so as to form at certain locations thereon acoustic impulse producing areas that will cause acoustic impulses having a substantially inverse noise attenuating phase relationship to the certain phase of acoustic impulses developed by the one set of contacting teeth and thereby reducing the noise from the gearing system.

9. A method of controlling the noise from a series of mating gears, the method comprising arranging the gears each on at least three different supports so that acoustic impulses are produced by two sets of contacting teeth, altering the lead and the tooth profile of the teeth on one of the gears so as to form at certain locations thereon acoustic impulse producing areas that will cause acoustic impulses of a certain phase to be developed by one set of contacting teeth, altering the lead and the tooth profile of the teeth on another of the gears so as to form a certain locations thereon acoustic impulse producing areas that will cause acoustic impulses having a substantially inverse noise attenuating phase relationship to the certain phase of the acoustic impulses developed by the one set of contacting teeth to be developed by the other set of contacting teeth.

10. A method of controlling the gear noise produced by a planetary gear set including carrier mounted planet pinions and a pair of gears, the method comprising arranging the gears and the pinions relative to each other so that each gear and pinion together generate a train of acoustic impulses and each pinion and pair of gears generate two trains of acoustic impulses, counterphasing the train of acoustic impulses generated by one gear and pinion and the train of acoustic impulses generated by the other gear and pinion so that the meshing engagements between the one gear and pinion and between the other gear and pinion occur at different times to thereby cause the acoustic impulses generated by the one gear and pinion to substantially cancel the acoustic impulses generated by the other gear and pinion, and counterphasing the two trains of acoustic impulses generated by each pinion and pair of gears so that the acoustic impulses generated by each pinion and pair of gears substantially cancel each other.

References Cited by the Examiner

UNITED STATES PATENTS

| | | | |
|---|---|---|---|
| 1,803,293 | 4/1931 | Bethune | 74—443 |
| 2,043,261 | 6/1936 | Neuland | 74—801 |
| 2,722,851 | 11/1955 | Steiner | 74—802 |
| 2,870,655 | 1/1959 | Rockwell | 74—785 |
| 2,966,067 | 12/1960 | Sommer | 74—355 X |

DON A. WAITE, *Primary Examiner.*